United States Patent
Roelle et al.

(10) Patent No.: US 6,683,947 B2
(45) Date of Patent: Jan. 27, 2004

(54) CALL CENTER MONITORING SYSTEM

(75) Inventors: William Roelle, Ridgefield, CT (US); Thomas Arcuri, New Milford, CT (US); Karen Zachacz, Stanley, KS (US); Jacqueline L. Coury, New Fairfield, CT (US); Carol Spaulding, Danbury, CT (US); Becky Bonk, Prairie Village, KS (US); Chris Bolejack, Shawnee, KS (US); Robert Muckle, Wolcott, CT (US); David Limric, Overland Park, KS (US); Suzy LeSage, Napa, CA (US)

(73) Assignee: General Electric Capital Corporation, Stamford, CT (US)

( * ) Notice: Subject to any disclaimer, the term of this patent is extended or adjusted under 35 U.S.C. 154(b) by 165 days.

(21) Appl. No.: 10/035,941

(22) Filed: Dec. 31, 2001

(65) Prior Publication Data

US 2003/0123640 A1 Jul. 3, 2003

(51) Int. Cl.[7] .................................................. H09M 3/00
(52) U.S. Cl. ............................. 379/265.03; 379/266.08
(58) Field of Search ........................ 379/265.03, 266.08, 379/265.01, 265.02, 265.06

(56) References Cited

U.S. PATENT DOCUMENTS

| | | | |
|---|---|---|---|
| 5,063,506 A | 11/1991 | Brockwell et al. | |
| 5,237,495 A | 8/1993 | Morii | |
| 5,406,477 A | 4/1995 | Harhen | |
| 5,461,699 A | 10/1995 | Arbabi et al. | |
| 5,630,070 A | 5/1997 | Dietrich et al. | |
| 5,638,519 A | 6/1997 | Haluska | |
| 5,740,238 A * | 4/1998 | Flockhart et al. | 379/221 |
| 5,754,639 A * | 5/1998 | Flockhart et al. | 379/221 |
| 5,787,437 A | 7/1998 | Potterveld et al. | |
| 5,793,632 A | 8/1998 | Fad et al. | |
| 5,799,286 A | 8/1998 | Morgan et al. | |
| 5,845,270 A | 12/1998 | Schatz et al. | |
| 5,854,746 A | 12/1998 | Yamamoto et al. | |
| 5,915,012 A * | 6/1999 | Miloslavky | 379/220 |
| 5,930,764 A | 7/1999 | Melchione et al. | |
| 5,937,051 A * | 8/1999 | Hurd et al. | 379/212 |
| 5,970,476 A | 10/1999 | Fahey | |
| 5,999,617 A * | 12/1999 | Oyanagi et al. | 379/265 |
| 6,006,196 A | 12/1999 | Feigin et al. | |
| 6,038,537 A | 3/2000 | Matsuoka | |
| 6,044,144 A * | 3/2000 | Becker et al. | 379/265 |
| 6,044,357 A | 3/2000 | Garg | |
| 6,058,375 A | 5/2000 | Park | |
| 6,078,893 A | 6/2000 | Ouimet et al. | |
| 6,125,355 A | 9/2000 | Bekaert et al. | |
| 6,151,582 A | 11/2000 | Huang et al. | |
| 6,175,824 B1 | 1/2001 | Breitzman et al. | |
| 6,236,977 B1 | 5/2001 | Verba et al. | |
| 6,249,770 B1 | 6/2001 | Erwin et al. | |
| 6,308,162 B1 | 10/2001 | Ouimet et al. | |
| 6,320,951 B1 * | 11/2001 | Shtivelman et al. | 379/211.01 |
| 6,522,743 B1 * | 2/2003 | Hurd | 379/266.04 |
| 2001/0013005 A1 | 8/2001 | Matsuzuki | |
| 2001/0032195 A1 | 10/2001 | Graichen et al. | |

* cited by examiner

Primary Examiner—Creighton Smith
(74) Attorney, Agent, or Firm—Buckley, Maschoff & Talwalker LLC

(57) ABSTRACT

A system to monitor a call center includes reception of call center data, determination of respective values of a plurality of measures based on the call center data, determination of a compliance description for each of the plurality of measures, presentation of an indicator in association with each of the plurality of measures, wherein an indicator presented in association with a measure corresponds to a compliance description determined for the measure, reception of a selection of a presented indicator, and presentation of a value of a measure associated with the selected indicator in response to the received selection.

39 Claims, 16 Drawing Sheets

| CALL ID 501 | CLIENT ID 502 | IVR? 503 | ABANDONED? 504 | HANDLE TIME 505 | ANSWER SPEED 506 |
|---|---|---|---|---|---|
| A0-4103 | C66 | NO | YES | N/A | N/A |
| A0-10117 | C66 | YES | NO | N/A | N/A |
| A0-10118 | C03 | NO | NO | 1:24 | :15 |

| CLIENT ID 601 | INQUIRY VOLUME 602 | IVR UTILIZATION 603 | ABANDONMENT RATE 604 | SERVICE LEVEL % 605 | AVERAGE HANDLE TIME 606 | AVERAGE ANSWER SPEED 607 |
|---|---|---|---|---|---|---|
| C66 | 83,741 | 35% | 1% | 90 | 4:10 | :07 |
| C03 | 75,443 | 50% | 5% | 98 | :56 | :13 |
| C44 | 61,882 | 65% | 17% | 84 | 9:08 | :11 |

FIG. 6

| CALL CENTER ID 701 | INQUIRY VOLUME 702 | IVR UTILIZATION 703 | ABANDONMENT RATE 704 | SERVICE LEVEL % 705 | AVERAGE HANDLE TIME 706 | AVERAGE ANSWER SPEED 707 |
|---|---|---|---|---|---|---|
| S04 | 73,949 | 20% | .5% | 80 | 3:07 | :06 |
| S09 | 61,443 | 70% | 9% | 98 | 2:10 | :11 |
| S22 | 60,843 | 37% | 12% | 90 | 7:30 | :13 |

| MEASURE 801 | IN CONTROL 802 | OUT OF CONTROL (+) 803 | OUT OF CONTROL (-) 804 | OUT OF CONTROL (ok) 805 | OUT OF SPEC 806 |
|---|---|---|---|---|---|
| INQUIRY VOLUME | LCL<LDP<UCL | LDP>UCL OR LDP<LCL | N/A | N/A | N/A |
| IVR UTILIZATION | LCL<LSPEC<LDP AND LDP<USPEC<UCL | LDP>UCL AND LDP>USPEC | LDP<LCL AND LDP<LSPEC | LDP < LCL AND LSPEC<LDP<USPEC | LDP >LCL AND LDP<LSPEC |
| ABANDONMENT RATE | LCL>LSPEC<LDP AND LDP<USPEC<UCL | LDP<UCL AND LDP <LSPEC | LDP>UCL AND LDP<USPEC | LDP>UCL AND LSPEC<LDP>USPEC | LDP<UCL AND LDP>USPEC |
| SERVICE LEVEL % | LCL>LSPEC<LDP AND LDP<USPEC<UCL | LDP>UCL AND LDP>USPEC | LDP<LCL AND LDP<LSPEC | LDP < LCL AND LSPEC<LDP<USPEC | LDP >LCL AND LDP<LSPEC |
| AVERAGE HANDLE TIME | LCL>LSPEC<LDP AND LDP>USPEC>UCL | LDP<UCL AND LDP <USPEC | LDP>UCL AND LDP<USPEC | LDP>UCL AND LSPEC<LDP>USPEC | LDP<UCL AND LDP>USPEC |
| AVERAGE ANSWER SPEED | LCL>LSPEC>LDP AND LDP>USPEC>UCL | LDP<UCL AND LDP <USPEC | LDP>UCL AND LDP<USPEC | LDP>UCL AND LSPEC<LDP>USPEC | LDP<UCL AND LDP>USPEC |

| MEASURE 901 | LOWER CONTROL LIMIT 902 | LOWER SPEC 903 | UPPER SPEC 904 | UPPER CONTROL LIMIT 905 |
|---|---|---|---|---|
| INQUIRY VOLUME | 65,000 | N/A | N/A | 80,000 |
| IVR UTILIZATION | 30% | 40% | N/A | 68% |
| ABANDONMENT RATE | 30% | 19% | 10% | 4% |
| SERVICE LEVEL | 70% | 85% | 92% | 97% |
| AVERAGE HANDLE TIME | 9:00 | N/A | 5:00 | 2:00 |
| AVERAGE ANSWER SPEED | :30 | N/A | :10 | :05 |

FIG. 9

| COMPLIANCE DESCRIPTION 1001 | INDICATOR 1002 |
|---|---|
| IN CONTROL | ● |
| OUT OF CONTROL (+) | ■ |
| OUT OF CONTROL (-) | □ |
| OUT OF CONTROL (ok) | ✚ |
| OUT OF SPEC | ☆ |
| EXCEEDING SPEC | ⬡ |
| DATA PROBLEM | X |
| NOT REPORTED | N/R |

CALL CENTER MONITORING SYSTEM

BACKGROUND OF THE INVENTION

1. Field of the Invention

The present invention relates to systems for presenting data. More specifically, the present invention concerns systems for collecting, analyzing and representing data generated by call centers.

2. Discussion of the Prior Art

Current network technology allows for the collection of data generated by remotely-located and disparate systems. Companies currently desire to exploit this technology in order to collect all data generated during company operations in a data warehouse. However, few companies are capable of efficiently processing and using this collected data to improve their respective business operations. Oftentimes, the collected data is therefore simply archived and subsequently ignored.

For those companies fortunate enough to effectively analyze their collected data, it is difficult to present the results of the analysis in a manner that is easy to comprehend and to act upon. Review of the data is accordingly left to a small team of specialists who are trusted to provide recommendations and notifications based on their review. Such a process can easily result in missed issues, problems and solutions, since those persons responsible for direct company operations are not able to judge the data for themselves.

The foregoing problems are demonstrably present in the call center industry. Typically, a call center provider operates several call centers that provide callers with customer service, sales or other functions. The functions may relate to a product or service offered by the call center provider or by another company. Each of these call centers is located in a remote geographic area in order to minimize overhead and operating costs. The call centers generate a great deal of data that is sent to a server operated by the provider. This data may be analyzed to calculate metrics related to call center activity, but difficulties in presenting the data and metrics in an understandable format hinder appropriate utilization thereof.

BRIEF SUMMARY OF THE INVENTION

In order to address the foregoing, some embodiments of the present invention concern a system, a user interface, a method, an apparatus, a computer-readable medium storing processor-executable process steps, and means to receive call center data, to determine respective values of a plurality of measures based on the call center data, to determine a compliance description for each of the plurality of measures, to present an indicator in association with each of the plurality of measures, wherein an indicator presented in association with a measure corresponds to a compliance description determined for the measure, to receive a selection of a presented indicator, and to present a value of a measure associated with the selected indicator in response to the received selection. By virtue of the foregoing features, call center performance may be effectively evaluated and appropriate actions may be taken based thereon.

In some embodiments, the invention relates to a plurality of representations each representing one of a plurality of call centers, a plurality of indicators associated with each representation, and each of the plurality of indicators associated with a representation being selectable and associated with a respective measure of performance of a call center represented by the representation. Moreover, a value of the respective measure of performance is presented in response to selection of the representation. Some of these embodiments provide for efficient understanding of call center performance in a manner previously unavailable.

In some embodiments, a system is provided including a plurality of call center devices, each of the plurality of call center devices associated with one or more call centers and storing call center data generated based on call center activities provided by the associated one or more call centers, a host system for receiving the call center data, for determining values for each of a plurality of measures based on the call center data, for determining a compliance description for each of the plurality of measures, and for associating an indicator with each of the plurality of measures, wherein an indicator associated with a measure represents a compliance description determined for the measure, and a user interface device for presenting a user interface comprising one or more of the associated indicators, for receiving a user selection of a presented indicator, and for presenting a value of a measure associated with the presented indicator.

According to some embodiments of the foregoing aspects, multi- and single-site call centers are provided with increased robustness, data accuracy, speed, reliability and ease of use. Additionally, data may be presented to a user at a relevant scale, enabling the user to understand and act at an appropriate level.

With these and other advantages and features that will become hereafter apparent, a more complete understanding of the nature of the invention can be obtained by referring to the following detailed description and to the drawings appended hereto.

BRIEF DESCRIPTION OF THE DRAWINGS

FIG. 5 is a tabular representation of a portion of a call center data database according to some embodiments of the present invention.

FIG. 6 is a tabular representation of a portion of a client measure database according to some embodiments of the present invention.

FIG. 7 is a tabular representation of a portion of a call center measure database according to some embodiments of the present invention.

FIG. 8 is a tabular representation of a portion of a compliance value database according to some embodiments of the present invention.

FIG. 9 is a representation of a portion of an indicator/compliance value table according to some embodiments of the present invention.

FIG. 10 is a representation of a portion of a compliance variable table according to some embodiments of the present invention.

DETAILED DESCRIPTION OF THE INVENTION

Figure 1:
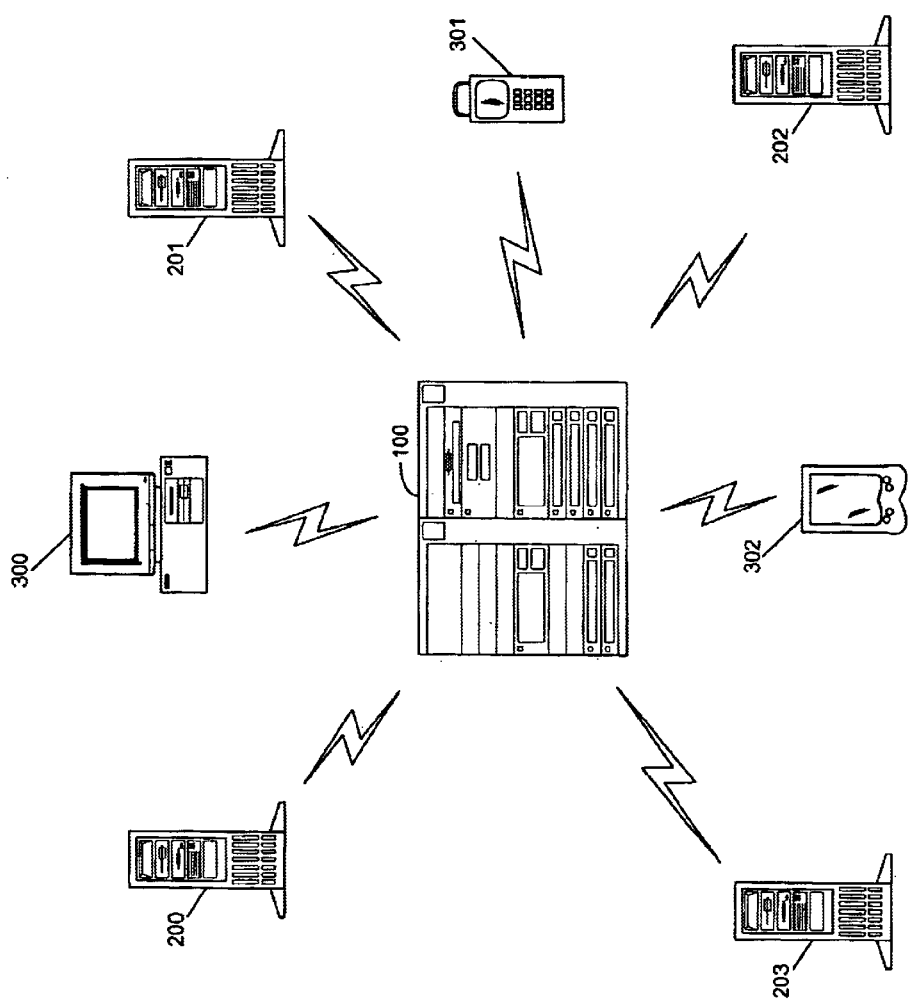
FIG. 1 is a diagram of a system architecture according to some embodiments of the invention.

FIG. 1 shows monitoring server 100 in communication with call center servers 200 through 203 and with user devices 300 through 302. Monitoring server 100 may comprise a network server or other device capable of performing the functions described herein. Monitoring server 100 may provide data analysis, web hosting, Quickplace™ hosting or other services for one or more entities, including an entity employing users of user devices 300 through 302. Therefore, monitoring server 100 may be an element of an intranet or a virtual private network including user devices 300 through 302.

According to some embodiments, monitoring server 100 operates to receive call center data from one or more of call center servers 200 through 203, to determine respective values of a plurality of measures based on the call center data, to determine a compliance description for each of the plurality of measures, to present an indicator in association with each of the plurality of measures by delivering data to one of user devices 300 through 302, wherein an indicator presented in association with a measure corresponds to a compliance description determined for the measure, to receive a selection of a presented indicator from the user device to which the data was delivered, and to present to the user device a value of a measure associated with the selected indicator in response to the received selection. As mentioned above, monitoring server 100 may provide other functions desired by the entities for which server 100 operates. These functions may include inventory, purchasing, payroll, accounting, and related reporting functions.

Call center servers 200 through 203 are operated by call centers that may be located remotely from one another. Call center servers 200 through 203 of FIG. 1 collect call center data generated at their respective call centers and transmit the data to monitoring server 100. In some embodiments, call center servers 200 through 203 also provide basic functions required for operation of a call center, such as call answering, call routing, Interactive Voice Response (IVR) functions, and the like. A single call center or call center server may provide call center functions for one or more clients, and a single client may be serviced by more than one call center and/or call center server. As described below with respect to FIG. 2, other devices may be used to provide call center functionality.

User devices 300 through 302 comprise a workstation, a cellular telephone and a Personal Digital Assistant (PDA), respectively, for providing functionality to one or more users. Specifically, any of user devices 300 through 302 may be used to transmit a request to view a measure of call center performance, to receive and present a user interface including measure and an indicator representing a value of the measure, to select the indicator, to transmit the selection to monitoring server 100, and to receive and to present call center data used to determine the value. In some embodiments, the indicator indicates whether and/or to what extent the value complies with specifications set for the measure. A detailed example of the foregoing process is set forth below. User devices 300 through 302 may also be used to provide other functions to a user, including e-mail services, word processing, calendaring, presentation development, budgeting, and the like.

It should be noted that the FIG. 1 devices may communicate using one or more systems for transferring data, including a local area network, a wide area network, a telephone network, a cellular network, a fiber-optic network, a satellite network, an infra-red network, a radio frequency network, and any other type of network which may be used to transmit information between devices. Moreover, such communication may proceed using any known transmission protocol, such as Asynchronous Transfer Mode (ATM), Internet Protocol (IP), Hypertext Transfer Protocol (HTTP) and Wireless Application Protocol (WAP). In one embodiment, communication network 100 is the World Wide Web.

In other embodiments, the devices of FIG. 1 are connected differently than as shown. For example, some or all of the devices may be connected directly to one another. Of course, embodiments of the invention may include devices that are different from those shown. It should also be noted that although the devices are shown in communication with each other, the devices need not be constantly exchanging data. Rather, communication may be established when necessary and severed at other times or always available but rarely used to transmit data. Moreover, although the illustrated communication links appear dedicated, it should be noted that each of the links may be shared by other devices.

Figure 2:
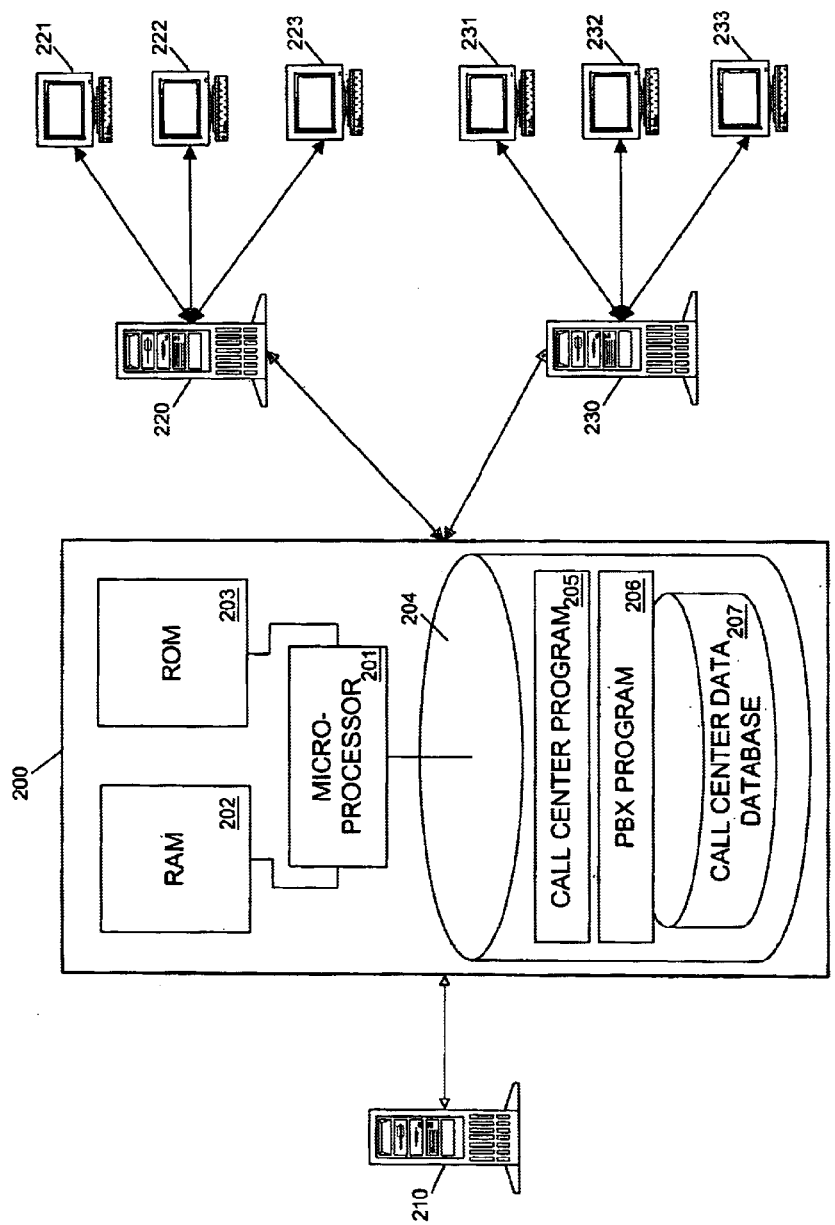
FIG. 2 is a block diagram illustrating an architecture of a call center according to some embodiments of the present invention.

FIG. 2 is a network architecture of a call center according to some embodiments of the present invention. Shown in FIG. 2 is call center server 200 in communication with call routing server 210 and IVR servers 220 and 230. Communicating in turn with IVR servers 220 and 230 are workstations 221 through 223 and workstations 231 through 233, respectively. As mentioned above, the FIG. 2 devices may communicate using any known media and/or protocol, and need not be linked as shown.

Call center server 200 includes microprocessor 201 in communication with RAM 202, ROM 203 and data storage device 204. Microprocessor 201 may be a Pentium™, RISC-based, or other type of processor and is capable of executing processor-executable process steps to control elements of call center server 200 so as to provide desired functionality. In this regard, processor-executable process steps being executed by microprocessor 201 are typically stored temporarily in RAM 202 and executed therefrom by microprocessor 201. ROM 203, in contrast, provides storage from which data can be retrieved but to which data cannot be stored. For example, ROM 202 may be used to store invariant process steps and other data, such as basic input/output instructions and data used during system boot-up or to control elements such as a communication port or keyboard (not shown).

Data storage device 204 provides mass storage of processor-executable and data files. As shown, data storage device includes call center program 205, PBX program 206 and call center database 207. Call center program 205 comprises processor-executable process steps used to provide some call center functionality. In this regard, call center program 205 may include a call management system for defining and executing call handling throughout the call center. The steps of call center program 205 may also be executed by processor 201 to track measures of call center performance, including IVR use, call abandonment, service level compliance, call handle time and answer speed. Of course, many other measures may be tracked by call center program 205. Moreover, the process steps of call center program 205 may be executed to provide other call center functionality including employee scheduling, accounting, payroll, and the like.

PBX program 206 is executed by processor 201 to receive and process incoming telephone calls using the private branch exchange service. Such programs are known in the art and any current or future program providing similar functionality may be used in embodiments of the invention.

Call center database 207 stores data generated during operation of the call center depicted in FIG. 2. The stored data may be used to determine values of measures of call center performance. Such determination will be described in detail below, and an example of call center database 207 will be described with respect to FIG. 5.

Other programs and databases may be stored in data storage device 204 to assist in the operation of call center server 200. These elements may comprise a customer service system for sampling call volume into the call center, and for categorizing reasons for each call.

Generally, call routing server 210 determines where calls received by call center server 200 should be routed. For example, a call may be routed to an IVR system, directly to a call center associate operating a workstation, or to another destination. Call routing server 210 may also capture data indicating call volumes at each point in the routing.

IVR servers 220 and 230 execute automated call answering software that allows a caller to navigate to a series of menus in order to reach a proper department or to receive automated information, such as account balances. IVR servers 220 and 230 receive incoming calls if call routing server 210 decides to route the calls thereto. IVR servers 220 and 230 may also generate call center data such as data indicating whether a call was resolved through IVR alone, a time spent per call navigating IVR menus, or the like. Such information may be transmitted to call center server 200 for storage in call center database 207.

Workstations 221 through 223 and 231 through 233 are used by call center associates to respond to incoming calls. For example, such calls may be received through computer telephony integration (CTI) software executed by the workstations. In addition, customer files and other data required to respond to the calls may be retrieved by a workstation from customer service files (not shown) stored in call center server 200 and displayed to an associate. As mentioned with respect to the other devices of FIG. 2, any and all of workstations 221 through 223 and 231 through 233 may also generate data used to evaluate call center performance, including a reason for a call, a time required for resolution, and whether a call was resolved. This generated data may be stored in data storage device 204.

Figure 3:
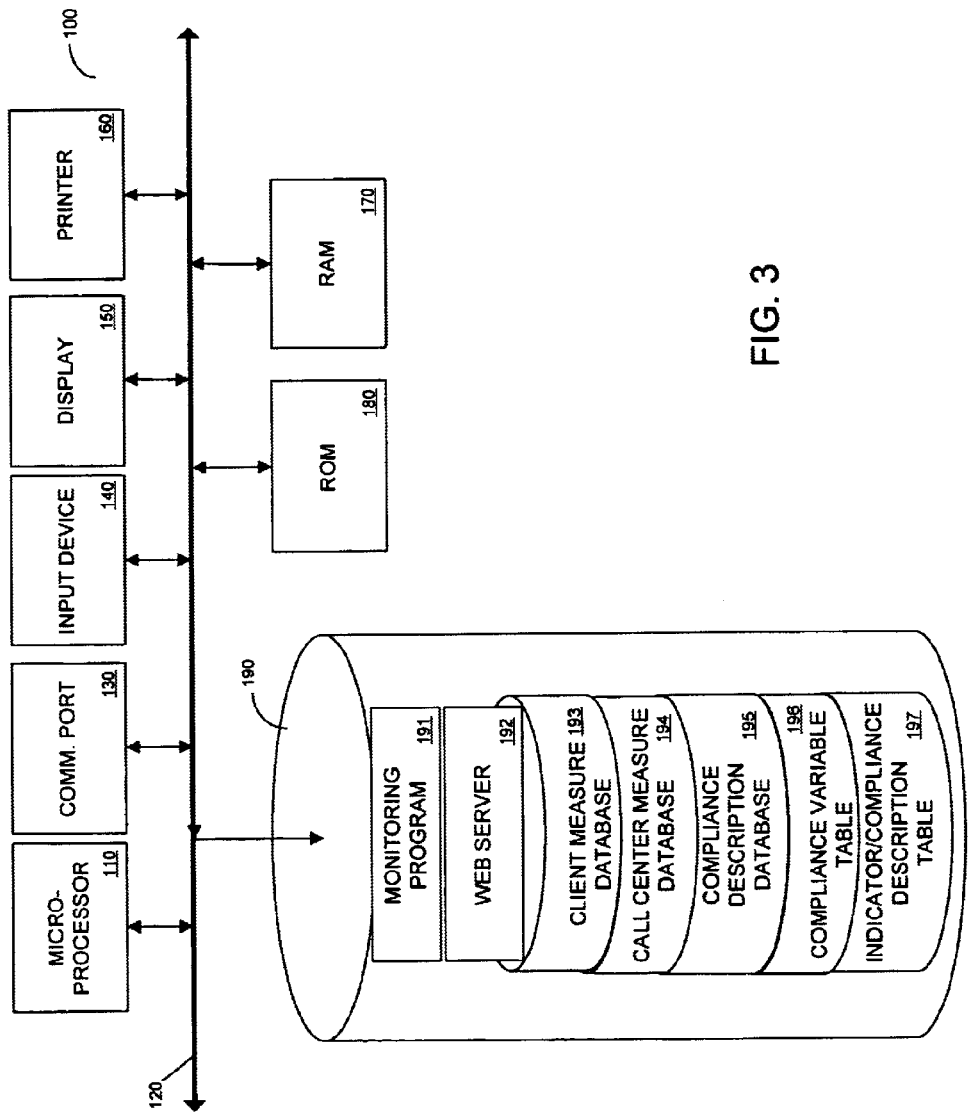
FIG. 3 is a block diagram illustrating an internal architecture of a monitoring server according to some embodiments of the present invention.

FIG. 3 is a block diagram of an internal architecture of monitoring server 100 according to embodiments of the invention. As illustrated, monitoring server 100 includes microprocessor 110 in communication with communication bus 120. As described with respect to microprocessor 201, microprocessor 110 executes processor-executable process steps so as to control the elements of server 100 to provide desired functionality.

Also in communication with communication bus 120 is communication port 130. Communication port 130 is used to transmit data to and to receive data from devices external to monitoring server 100. Communication port 130 is therefore preferably configured with hardware suitable to physically interface with desired external devices and/or network connections. For example, communication port 130 may comprise an Ethernet connection to a local area network through which monitoring server 100 may receive and transmit call center data over the Web.

Input device 140, display 150 and printer 160 are also in communication with communication bus 120. Any known input device may be used as input device 140, including a keyboard, mouse, touch pad, voice-recognition system, or any combination of these devices. Input device 140 may be used by an operator of monitoring server 100 to input compliance specifications, indicators and associated compliance values, and other information. Of course, such information may also be input to monitoring server 100 via communication port 130.

Information may be presented to an operator user via display 150, which may be an integral or separate CRT display, flat-panel display or the like, in response to commands issued by microprocessor 110. Such information may include user interfaces according to embodiments of the invention or other text and graphics. Printer 160 may also present text and graphics to a user, but in hardcopy form using ink-jet, thermal, dot-matrix, laser, or other printing technologies.

RAM 170 is connected to communication bus 120 to provide microprocessor 110 with fast data storage and retrieval. And ROM 180, similarly to ROM 203, provides storage from which data can be retrieved but to which data cannot be stored.

Data storage device 190 stores, among other data, processor-executable process steps of monitoring program 191. Microprocessor 110 executes the process steps of monitoring program 191 in order to control monitoring server 100 to monitor one or more call centers and/or to provide user interfaces for monitoring call centers. More specifically, the process steps of monitoring program 191 may be executed by microprocessor 110 to receive call center data, to determine respective values of a plurality of measures based on the call center data, to determine a compliance description for each of the plurality of measures, to present an indicator in association with each of the plurality of measures, wherein an indicator presented in association with a measure corresponds to a compliance description determined for the measure, to receive a selection of a presented indicator, and to present a value of a measure associated with the selected indicator in response to the received selection.

The process steps of monitoring program 191 may be read from a computer-readable medium, such as a floppy disk, a CD-ROM, a DVD-ROM, a Zip™ disk, a magnetic tape, or a signal encoding the process steps, and then stored in data storage device 190 in a compressed, uncompiled and/or encrypted format. In alternative embodiments, hard-wired circuitry may be used in place of, or in combination with, processor-executable process steps for implementation of the processes of the present invention. Thus, embodiments of the present invention are not limited to any specific combination of hardware and software.

Data storage device 190 also stores processor-executable process steps of Web server 192. These process steps may be executed by microprocessor 110 to transmit data to and to receive data from Web clients, such as Web browsers, over the Web. As described above, the data may comprise Web pages including user interfaces according to embodiments of the present invention, selections of indicators, and Web pages including call center data.

Several other files are stored in data storage device 190 of FIG. 3. These files include client measure database 193, call center measure database 194, compliance description database 195, compliance variable table 196 and indicator/compliance description table 197. Client measure database 193 includes measures determined based on call center data relating to a particular client, and call center measure database 194 includes measures determined based on call center data relating to a particular call center. Compliance description database 195 and compliance variable table 196 include data used to determine a compliance description to associate with a determined value of a measure. Once the compliance description is determined, data included in indicator/compliance description table 197 is used to determine an indicator that will be used in a user interface to associate the measure with the compliance description.

Also stored in data storage device 190 may also be other unshown elements that may be necessary for operation of monitoring server 100, such as other applications, other data files, an operating system, a database management system and "device drivers" for allowing microprocessor 110 to interface with devices in communication with communication port 130. These elements are known to those skilled in the art, and are therefore not described in detail herein.

Figure 4:
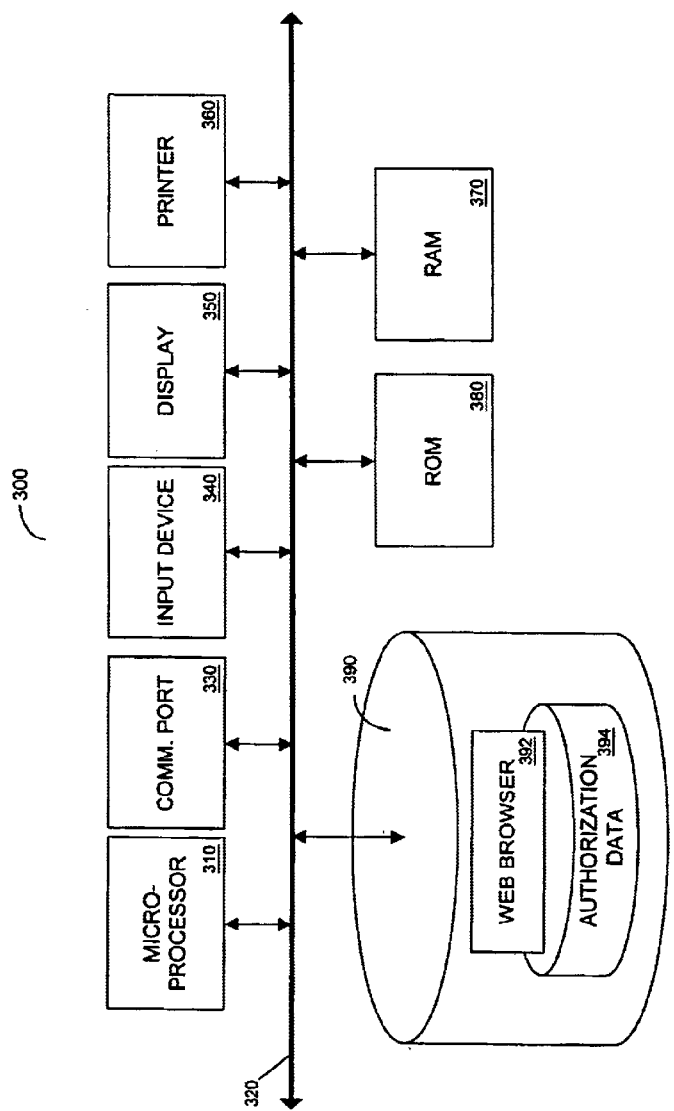
FIG. 4 is a block diagram illustrating an internal architecture of a user device according to some embodiments of the present invention.

FIG. 4 illustrates several components of user device 300 according to some embodiments of the invention. The components may comprise any of the specific examples set forth above with respect to identically-named components of monitoring server 100. Of course, specific functions performed by the components may differ from the functions performed by the identically-named components.

For example, communication port 330 may be used to receive data comprising user interfaces from and to transmit selections of indicators to monitoring server 100. In this regard, input device 340 may be used by a user to select indicators presented by display 350 in association with call center measures. Input device 340, display 350 and printer 360 may also be used in conjunction with other applications provided by user device 300 which are unrelated to the present invention.

Data storage device 390 stores processor-executable process steps of Web browser 392. The process steps of Web browser 392 may be executed by microprocessor 310 to allow user device 300 to send and receive information over the Web. More specifically, Web browser 392 allows user device 300 to transmit information to and to receive information from a device executing process steps of a Web server, such as monitoring server 100.

Also stored in data storage device 390 is authorization data 394. Authorization data 394 is used to provide a user operating user device 300 with access to restricted applications, networks, websites, or the like. In one example, Web browser 392 is executed to request data from a Web server. In response, the Web server queries Web browser 392 for authentication information required to access the Web server. The required information is retrieved from authorization data 394 and passed to the Web server. The Web server may then use the data to determine whether the user is authorized to receive particular Web pages, and/or to customize Web pages for presentation to the user.

Data storage device 390 may also store application files, data files and system files other than those shown in FIG. 4.

As mentioned above, these files may be used to provide a user with functions other than that provided by the present invention, such as e-mail functions, word processing functions, and the like.

A tabular representation of a portion of call center data database 207 is shown in FIG. 5. Call center data database 207 includes information relating to particular calls received and processed by call center server 200. The portion includes several records, with each record consisting of several associated fields. The fields include call ID field 501, client ID field 502, IVR? field 503, abandoned? field 504, handle time field 505, and answer speed field 506. The fields may be populated by data generated by call center server 200 or by data received from other elements of the call center shown in FIG. 2. Additionally, the data may be transmitted to monitoring server 100 for determination of the values of call center-related measures based thereon.

Call ID field 501 of a record specifies an identifier associated with a received call that is the subject of the record, and client ID field 502 specifies a client for whom the call was handled. For example, calls received at any of a first set of telephone numbers may be assumed to be related to one particular client, while calls received at any of a second set of telephone numbers may be assumed to be related to another client. In some embodiments, a call center provides call center services for a single client. In these embodiments, it may not be necessary to associate each incoming call with a client ID as shown in FIG. 5.

IVR? field 503 of a record includes a flag indicating whether the subject call was handled and disposed of exclusively by an IVR system executed by one of IVR servers 220 or 230. As such, the data specified in IVR? field may be received from one of servers 220 and 230. Abandoned? field 504 also includes a flag relating to an incoming call, the flag indicating whether the caller terminated the call after exiting an IVR system but prior to answer of the call by an associate.

Handle time field 505 represents an amount of time required to handle a call once it reached an associate. The time includes actual speaking time with the customer, hold time, and time required to complete work relating to the call after completion of the call. Again, these times may be monitored by any call center device, including those not shown in FIG. 2. Answer time field 506 associated with a call specifies an amount of time elapsed between the call exiting an IVR system and answer of the call by an associate.

Call center data database 207 may also include other fields providing other call-related information. For example, call center database 207 may also include fields specifying a date and time on which a call was received by server 200, an explanation of the call's resolution, and an identity of an associate who handled the call. Moreover, although FIG. 5 illustrates information related to a single call center, it should be noted that call center data database 207 may include information related to more than one call center.

FIG. 6 shows a tabular representation client measure database 193. Client measure database 193 includes values of various measures for each of one or more clients. Generally, the values are determined by execution of monitoring program 191 and are based on call center data received from call center servers. Each record of client measure database 193 consists of several associated fields, including client ID field 601, inquiry volume field 602, IVR utilization field 603, abandonment rate field 604, service level % field 605, average handle time field 606 and average speed of answer field 607.

Client ID field 601 of a record indicates a client associated with the measure values specified by the record. Therefore, the values specified in a record are determined based on call center data relating to a client associated with the record. Such call center data may be received from one or more cell center servers providing call center services for the client.

Inquiry volume field 602 indicates a total number of calls received on behalf of a client over a given time period. This total number is determined, in some embodiments, by totaling the number of data records received by monitoring server 100 that are associated with the client (by virtue of client ID field 502) and that represent call received during the given time period.

IVR utilization field 603 indicates a percentage of all phone inquiries disposed of on behalf of the associated client by an IVR system. The contents of IVR? field 503 of received data records pertaining to the client may be used to determine whether a call was disposed of by an IVR system. The percentage of IVR utilization field 603 is then determined by dividing the number of thusly-disposed calls by the total number of calls received on behalf of the client. Alternatively, received call center data may specify how many calls entered an IVR system and how many calls exited an IVR system on behalf of the client. In such a case, the number of IVR-disposed calls may be determined by subtracting the number of exiting calls from the number of entering calls.

Abandonment rates specified in abandonment rate field 604 are determined by first determining a total number of calls received on behalf of a client which were disconnected after exiting an IVR system but before being answered by an associate. This number is equal to the number of call center data records associated with the client and specifying "Yes" in abandoned? field 504. In some embodiments, the number is divided by the sum of the total of associate-answered calls and the number, thereby excluding blocked and forced disconnect calls from the determination.

Service level % field 605 of a record indicates a number of post-IVR calls answered within a specified amount of time divided by a number of associate-answered calls. Data required for this calculation may be received from call canter data database 207. The amount of time may be specified by a contract with a client associated with the record, an internal target, or a client expectation.

Average handle time field 606 associated with a client simply indicates an average of times specified in handle time field 505 for all associate-answered calls associated with the client. As shown in FIG. 5, handle time field 505 specifies "N/A" for those calls not answered by an associate. Accordingly, these calls are not included in the determination of average handle time field 606. Similarly, average answer speed field 607 associated with a client provides an average of times specified in answer speed field 506 for all associate-answered calls associated with the client. Again, calls not answered by an associate are not associated with an answer speed in call center data database 207, and are therefore not included in the determination of average answer speed field 607.

FIG. 7 illustrates a tabular representation of a portion of call center measure database 194. Call center measure database 194 is similar to client measure database 193, except that each record of call center measure database 194 relates to calls received by a single call center, regardless of the client or clients on behalf of whom the calls were received. Accordingly, the reader is directed to the description of FIG. 6 for a discussion of the measures shown in FIG. 7. It should be noted that the values shown in FIG. 6 and FIG. 7 may relate to calls received over any specified period of time. It may therefore be beneficial to include a field specifying a time period of interest with each record of client measure database 193 and/or call center measure database 194. Since these values are, in some embodiments, based on data received from call center data database 207, determination of such values may be facilitated by associating each record of call center data database 207 with a date and time.

Of course, client measure database 193 and call center measure database 194 may specify values of measures alternative or in addition to those shown in FIG. 6 and discussed above. Some usable measures include: inquiry volume by channel, blocked call rate, first inquiry resolution defects, errors and concessions waived, and unit cost per inquiry.

A portion of compliance description database 195 is illustrated in tabular form in FIG. 8. Compliance data database 195 includes data used to determine a compliance description for a measure according to some embodiments of the present invention. A compliance description is a shorthand description that assists a user in evaluating a value of an associated measure. For example, a compliance description associated with a measure may indicate that the value of the measure is satisfactory. Such a description would reduce a need for the user to know what values are satisfactory for particular measures.

Measure field 801 of a record specifies a measure. Accordingly, the record includes compliance information for determining compliance descriptions to associate with the specified measure. Associated with each measure are several fields including compliance information, namely in control field 802, out of control field (+) field 803, out of control field (−) field 804, out of control (ok) field 805 and out of spec field 806. The information included in each field specifies the condition or conditions that, if met, indicate that an associated measure is described by the compliance description associated with the field. Neither the compliance descriptions nor the possible conditions are limited to those shown in FIG. 8.

In the illustration, the compliance variable "LDP" refers to last data point, "LCL" refers to lower control limit, "LSPEC" refers to lower specification, "USPEC" refers to upper specification, and "UCL" refers to upper control limit. Therefore, it may be determined that the compliance description "in control" applies to a value of the "inquiry volume" measure if the last data point of the value is between a lower control limit and an upper control limit associated with the measure. In this regard, values of each of the compliance variables may differ across individual measures.

Compliance variable table 196 of FIG. 9 specifies values of the compliance variables for each measure. Accordingly, each record of table 196 includes fields specifying a measure and compliance variable values associated with the measure. As will be described below, the determination of compliance descriptions associated with measures may be easily modified by changing the compliance variable values of compliance variable table 196.

FIG. 10 illustrates indicator/compliance description table 197, which associates a compliance description with a particular indicator. More specifically, and according to some embodiments, call center data is received and is used to determine values for a plurality of measures. The values are evaluated against the conditions specified for respective measures in compliance description database 195, using compliance variable values stored in compliance variable table 196. Depending on the condition satisfied, a compliance description is determined for each measure. Next, an indicator associated with each determined compliance description is determined using table 197. The determined indicators may then be presented to a user in association with associated measures. It should be noted that indicator/compliance description table 196 may be easily modified so as to specify different associations between compliance descriptions and indicators.

It is contemplated that the above-described databases and tables may include many more records than those shown and that each record may include associated fields other than those illustrated. It should also be noted that the tabular illustrations and accompanying descriptions merely represent relationships between stored information. A number of other arrangements may be employed besides the ones suggested.

Figure 11:
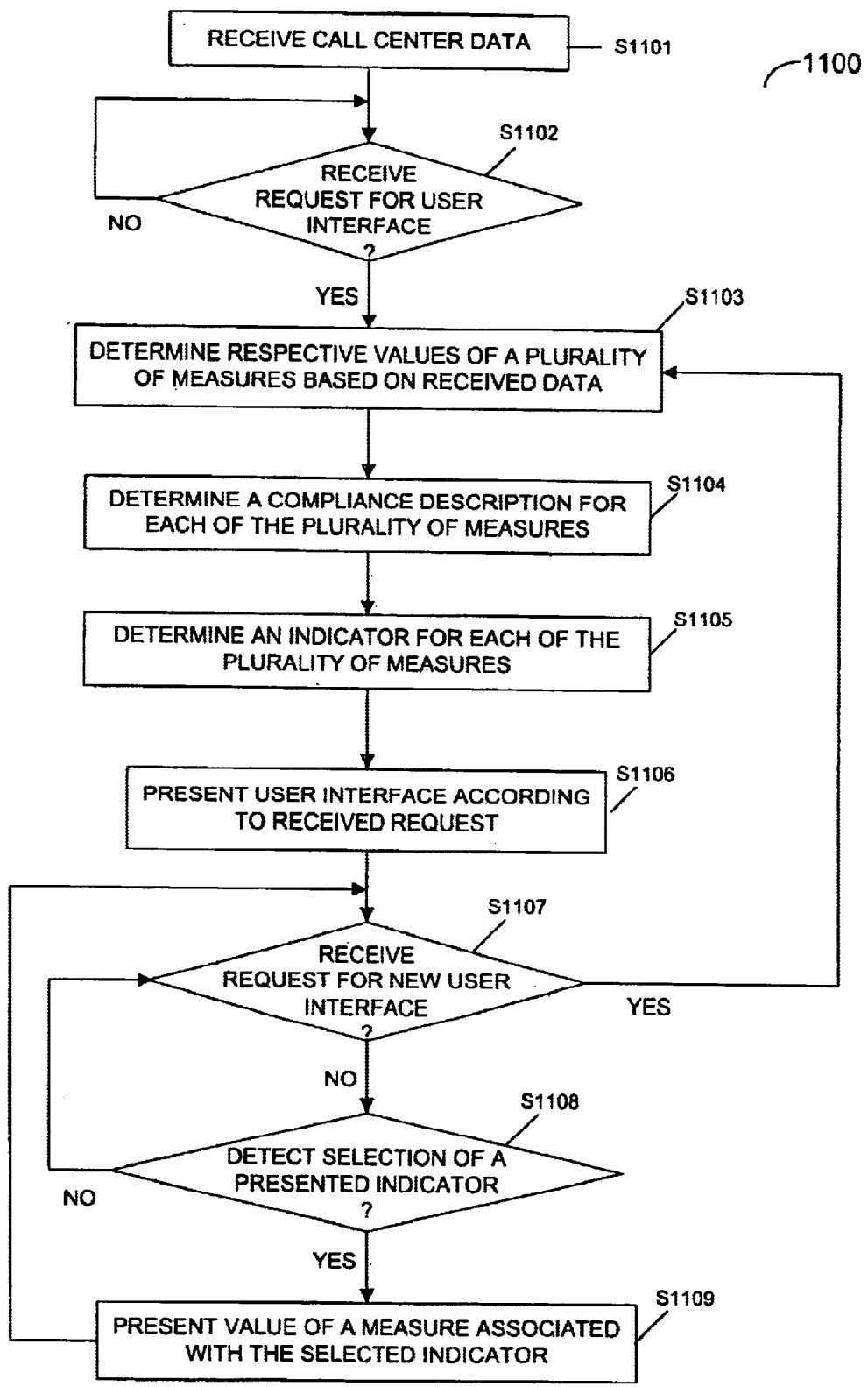
FIG. 11 illustrates a flow diagram of process steps according to some embodiments of the invention.

FIG. 11 comprises a flow diagram of process steps 1100 for monitoring call centers according to some embodiments of the present invention. In the foregoing description of process steps 1100, it will be assumed that process steps 1100 are embodied in monitoring program 191 and executed by microprocessor 110 of monitoring server 100. However, process steps 1100 may also be embodied, in whole or in part, in any one of call center servers 200 through 203, in any of user devices 300 through 302, and in any other device.

Initially, in step S1101, call center data is received by monitoring server 100. The call center data may be received from one or more of call center servers 200 through 203, and includes data generated during call center activities. The received data may include records such as those described with respect to call center data database of FIG. 5. Generally, the data may include any information relating to call center activity, including but not limited to the data discussed above. In some embodiments, the received data relates to a specific client or clients, a specific type of call, or to any specific characteristic by which call center data may be sorted.

The data may be received in step S1101 in response to according to a predefined data delivery schedule. For example, each of call center servers 200 through 203 may be instructed to automatically transmit call center data to monitoring server 100 at the close of business each day. Of course, any schedule may be followed, and each of call center servers 200 through 203 may transmit the data according to a different schedule. The data may also be transferred manually in response to a command input to a call center server.

The data may be transmitted in response to the detection of a condition. In one example, the data is transmitted once it is detected that data for 1,000 calls has been collected since a last transmission. The data may also be transmitted upon receiving a request from monitoring server 100. Any combination of scheduled, manual and event-driven data transmission may be used by any of servers 200 through 203 according to embodiments of the invention.

Flow then pauses at step S1102 while monitoring server 100 waits to receive a request for a user interface according to some embodiments of the present invention. For example, a user of user device 300 may operate input device 340 to execute process steps of Web browser 392 prior to step S1102. Also prior to step S1102, input device 340 is used to input an address of a website associated with Web server 192 executing within monitoring server 100. Process steps of Web browser 392 are then executed to transmit a query to the website, and, in response, Web browser 392 transmits a Web page to user device 300. The website may be accessible only over an intranet to which both user device 300 and monitoring server 100 belong, over the Web via a secure protocol, or over another network type. Authorization data 394 or other security measures protection may be used to assure that the user is an authorized recipient of the Web page and/or to customize the Web page for the user.

Figure 12:
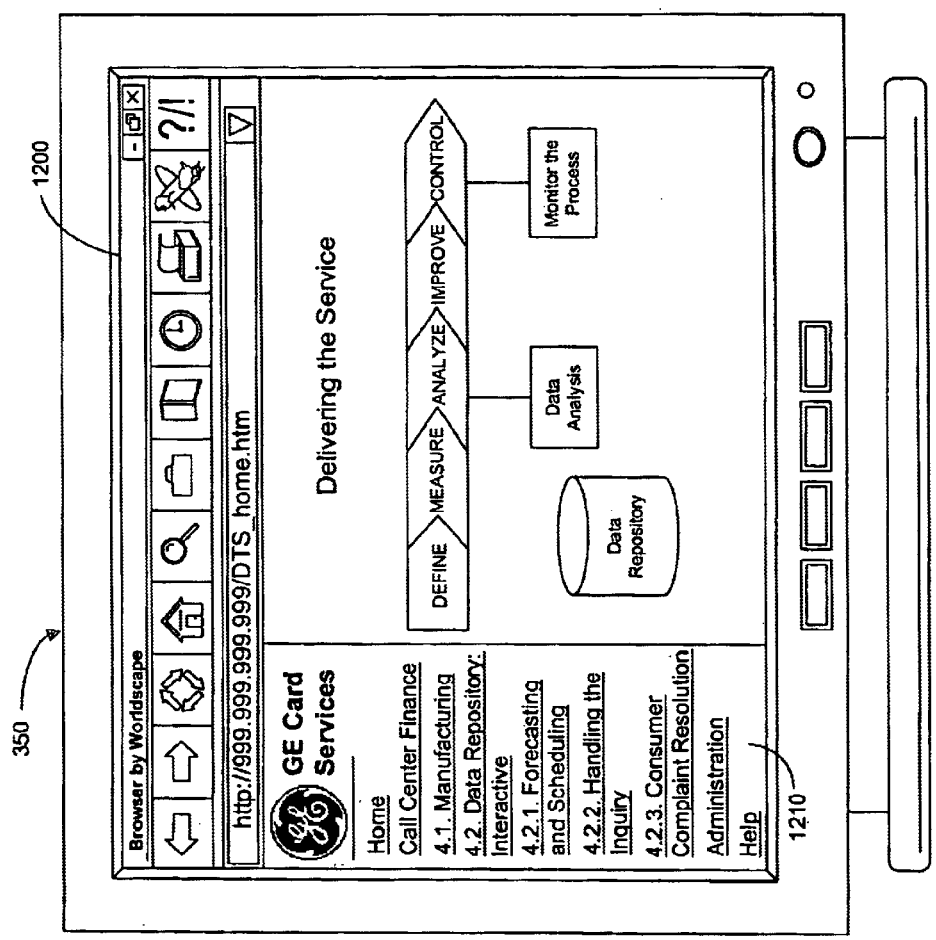
FIG. 12 is a view of a user interface according to some embodiments of the invention.

FIG. 12 is an outward view of display 350 after receipt of such a Web page. Specifically, browser window 1200 shows a home page of a website provided by monitoring server 100. Navigation frame 1210 includes a hyperlink tree usable to navigate among pages of the website. In this regard, selection of certain hyperlinks of the tree causes Web browser 392 to transmit a request for a user interface that is received by monitoring server 100 in step S1102.

Figure 13:
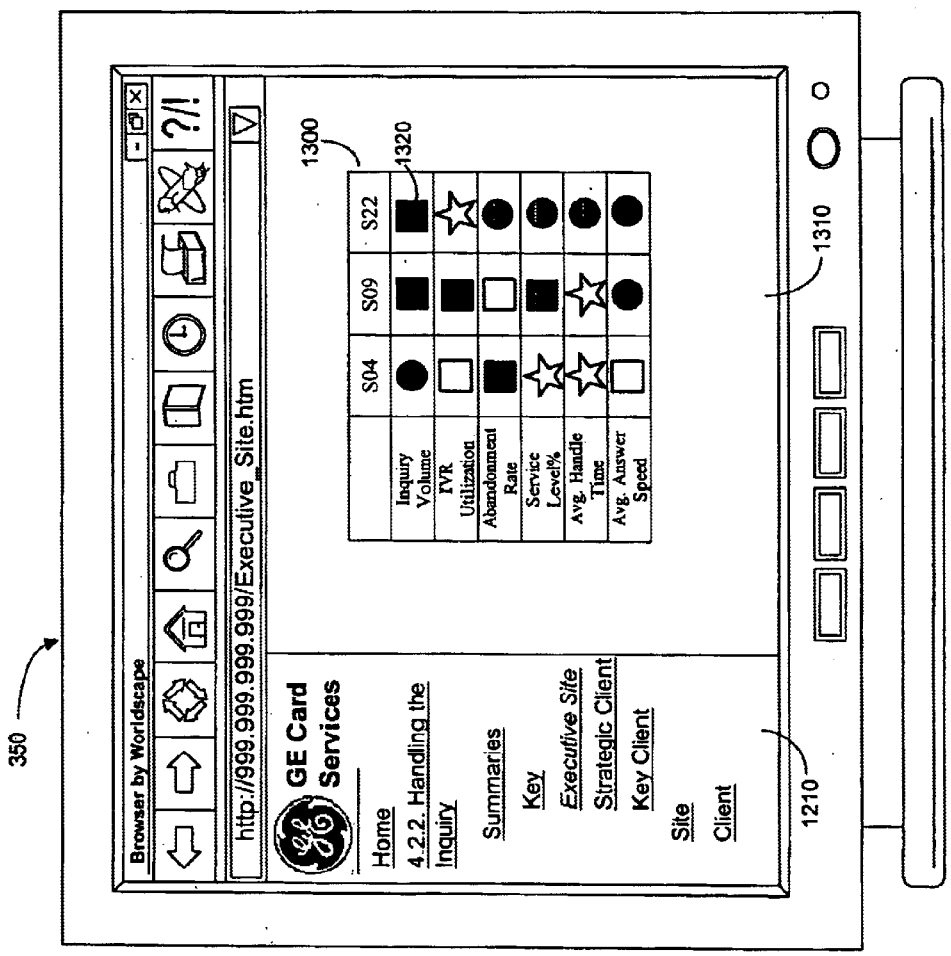
FIG. 13 is a view of a user interface according to some embodiments of the invention.

FIG. 13 shows display 350 and navigation frame 1210 after selection of the hyperlink "4.2.2. Handling the Inquiry" and after subsequent selection of nested hyperlinks "Summaries" and "Executive Site". In the present example, selection of the hyperlink "Executive Site" causes monitoring server 100 to receive a request for a user interface in step S1102.

Accordingly, in step S1103, respective values of a plurality of measures are determined based on the data received in step S1101. The determination of the values is governed by the user interface requested in step S1102. In the present example, selection of the hyperlink "Executive Site" comprises a request for a user interface reflecting the performance of each call center (or "site") over a prior week. Accordingly, each value is determined in step S1103 based on calls received by a single call center during the week. The determined values are used to populate call center measure database 194. More specifically, values of each of the measures inquiry volume, IVR utilization, abandonment rate, service level %, average handle time and average answer speed are determined for each call center as described with respect to FIG. 6.

A compliance description is determined for each measure in step S1104. A compliance description provides a description that may be useful in evaluating the extent to which the value of a measure is satisfactory or unsatisfactory. Accordingly, each value determined in step S1103 is used to determine a compliance description for an associated measure as described with respect to FIG. 8 and 9. More specifically, in some embodiments of step S1104, conditions associated with a measure in compliance description database 195 are evaluated. In order to evaluate the conditions, compliance variable values associated with the measure are retrieved from compliance variable table 196. Once a condition associated with the measure is found to be true, the compliance description associated with the condition is determined to be compliance description for the measure. As described above, the use of compliance variables in compliance description database 195 allows for easy modification of the conditions based on which compliance descriptions are determined.

An indicator is determined for each of the plurality of measures in step S1105. The determination of step S1105 may be accomplished simply by, for each measure, using indicator/compliance description table 197 to identify an indicator corresponding to a compliance description that is associated with the measure. Therefore, after completion of steps S1103 through S1105, indicators corresponding to each measure to be presented by the requested user interface are determined.

A user interface including the indicators is presented in step S1106. The user interface may be presented by virtue of a transmission of a Web page including the interface from monitoring server 100 by to user device 300. In such instances, monitoring program 191 and Web server 192 are executed in conjunction with one another to create an HTML, XML, or otherwise-formatted Web page including the user interface and to transmit the Web page to Web browser 392 of user device 300. User interface 1300 of FIG. 13 is one example of such a user interface.

With more particularity, user interface 1300 of FIG. 13 shows a plurality of representations each representing one of a plurality of call centers, a plurality of indicators associated with each representation, each of the plurality of indicators associated with a representation being selectable and associated with a respective measure of performance of a call center represented by the representation, wherein a value of the respective measure of performance is presented in response to selection of the representation. As shown, an indicator associated with a measure and a call center corresponds to a compliance description determined for that measure. Moreover, each indicator associated with a measure and a call center provides an easily-understood evaluation of a value of the measure. Main frame 1310 may include other information, such as general or call-center specific comments helpful for interpreting the indicators of user interface 1300. It should be noted that the value/measure/compliance description/indicator associations shown in user interface 1300 reflect the data of FIGS. 7 through 10.

User interface 1300 may include indicators for measures related to only a particular subset of calls received by a particular site. For example, each site representation may be associated with two indicators per measure. In some embodiments, the first indicator corresponds to a compliance description determined for a measure associated only with calls placed by credit card customers and the second indicator corresponds to a compliance description determined for a measure associated only with measures determined for calls placed by credit card issuers. Of course, such embodiments may include determination of such measures, compliance descriptions and indicators in steps S1103 though S1105, respectively. In this regard, the determinations are facilitated if the received call center data upon which these determinations are based identifies whether a call was received from a credit card customer or a credit card issuer.

In some embodiments, one or more of the associated measure values, compliance descriptions and indicators reflected in a presented user interface are determined prior to step S1102. These embodiments may allow for faster presentation of a requested user interface, but may decrease flexibility of the system and require greater storage and pre-processing resources.

Flow proceeds to step S1107 wherein it is determined whether a request for a new user interface has been received. The command may comprise a request for another Web page received from user device 300 in response to a selection of another hyperlink from navigation frame 1210. If no such command is received, flow continues to step S1108. In step S1108, it is determined whether an indicator presented within the presented user interface has been selected. More specifically, each presented indicator may comprise a hyperlink. A user may therefore use input device 350 to select an indicator and, as a result, a request for data will be transmitted to monitoring server 100. The request will indicate to monitoring server that an indicator has been selected, and will specify the selected indicator. If a selection of an indicator is not detected in step S1108, flow returns to step S1107. Accordingly, flow cycles between steps S1107 and S1108 until either a request for a new user interface is received or a selection of a presented indicator is detected.

Figure 14:
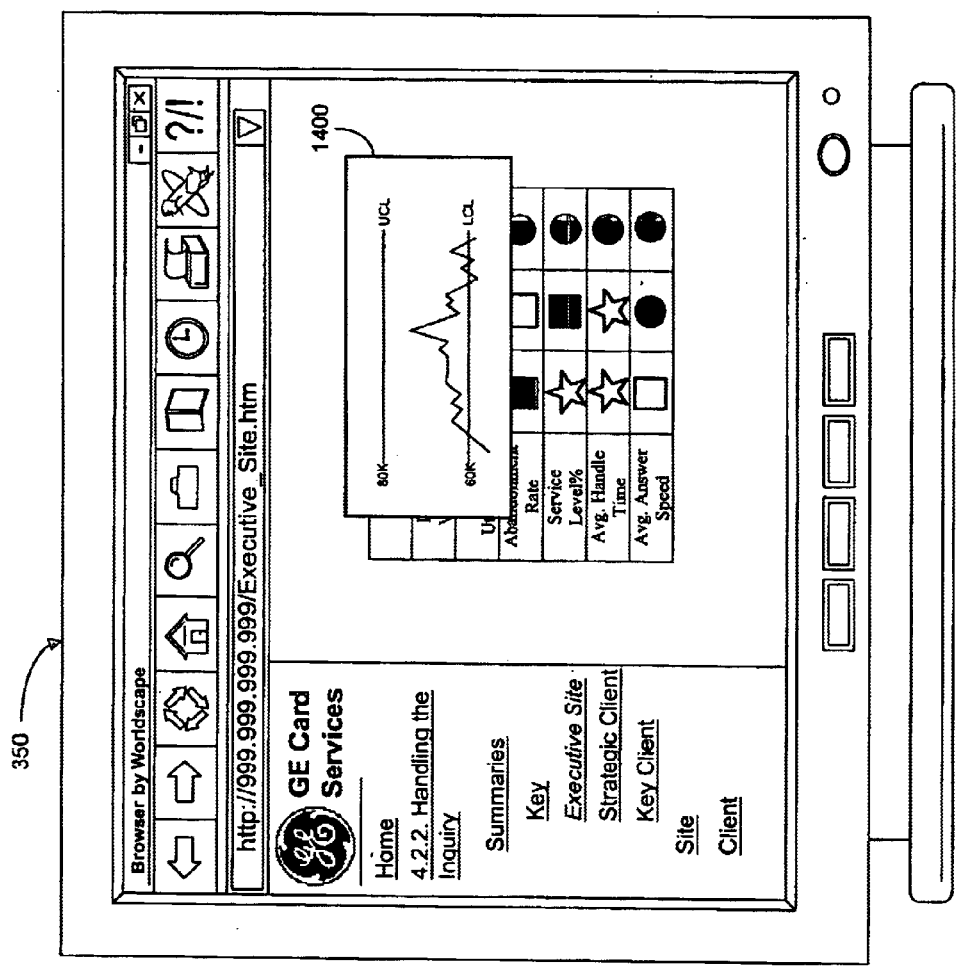
FIG. 14 is a view of a user interface according to some embodiments of the invention.

For illustration, it is now assumed that indicator 1320 is selected and that the selection is detected in step S1108. Flow therefore proceeds to step S1109, wherein monitoring server 100 presents a value of a measure associated with the selected indicator by transmitting the value to user device 300. The presented value is the value of the measure determined in step S1103. The value may be presented by display 350 in many forms. FIG. 14 shows the value as presented in graphical form using a pop-up window.

Graph 1400 shows values of the measure over a period of time. Advantageously, graph 1400 also shows values of compliance variables used to determine the selected compliance indicator. Such a presentation of the value provides information for efficiently evaluating the value, the associated measure, and the associated call center. Although data used to create graph 1400 may be received from monitoring server 100 from call center measure database 194 and from compliance variable table 196, graph 1400 may be received from monitoring server 100 or may be generated based on the received data by user device 300. Flow returns to step S1107 from step S1109 and cycles as described above.

It is now assumed that input device 350 is used to select hyperlink "Strategic Client" from navigation frame 1210 of FIG. 14. As a result, monitoring server 100 receives a request for a Web page associated with the hyperlink. The request is deemed to comprise a request for a new user interface in step S1107 and flow therefore returns to step S1103. Steps S1103 through S1105 proceed as described above to determine the measure values, compliance descriptions and indicators to be represented in the new user interface. In this regard, the user interface associated with the hyperlink "Strategic Client" represents values determined based on calls received on behalf of one client. Accordingly, the values are determined in step S1103 on a per-client basis and stored in appropriate fields of client measure database 193. Additionally, compliance variables used to determine a compliance description in step S1104 may be assigned different values depending on the client for whom the description is to be determined.

Figure 15:
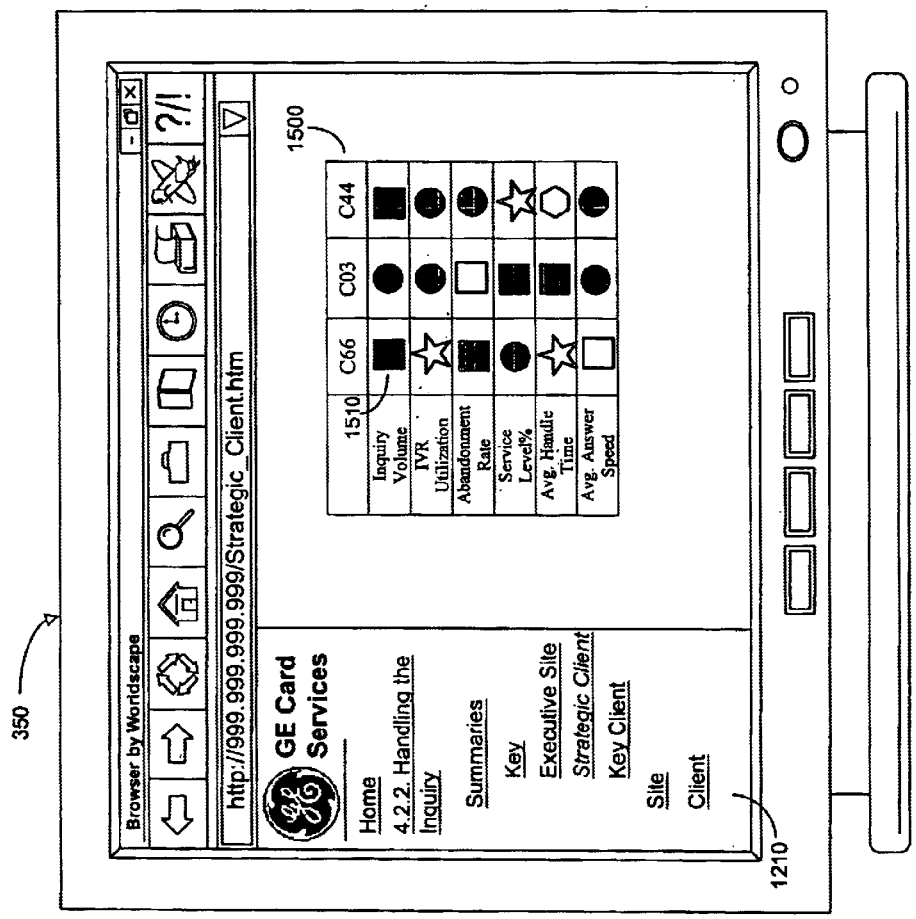
FIG. 15 is a view of a user interface according to some embodiments of the invention.

FIG. 15 shows user interface 1500 as presented to user device 300 and to a user in step S1106 after selection of the hyperlink "Strategic Client". Briefly, user interface 1500 includes a plurality of representations, each of the plurality of representations representing one of a plurality of clients, a plurality of indicators associated with each representation, each of the plurality of indicators associated with a representation being selectable and associated with a respective measure of performance of one or more call centers relating to a client represented by the representation, wherein a value of the respective measure of performance is presented in response to selection of the representation. The associated clients/measures and indicators of user interface 1500 reflect the data of FIGS. 6, 8, 9 and 10.

Figure 16:
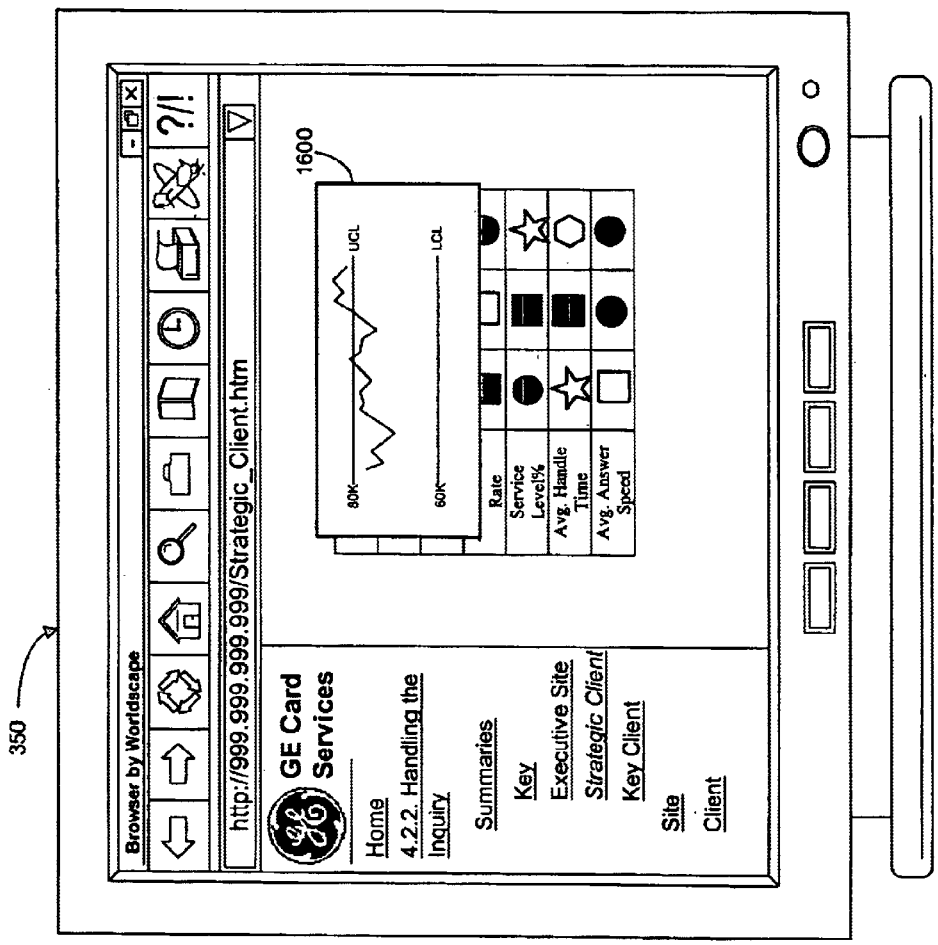
FIG. 16 is a view of a user interface according to some embodiments of the invention.

In a case that indicator 1510 of user interface 1500 is selected, graph 1600 of FIG. 16 is presented in step S1109. The values presented in graph 1600 are the values used to determine the selected indicator in step S1105. The values may be retrieved from appropriate fields of client measure database 193. As mentioned with respect to graph 1400, graph 1600 also shows values of compliance variables used to determine the selected indicator.

For the sake of completeness, it is noted that navigation frame 1210 of FIG. 15 includes hyperlinks "Key", "Key Client", "Site" and "Client". The hyperlink "Key" provides a link to a Web page showing associations between indicators and compliance descriptions such as those set forth in indicator/compliance value table 197. "Key Client" provides a user interface similar to user interface 1500, although relating to clients other than those reflected in interface 1500. Finally, the hyperlinks "Site" and "Client" each expand to show links to each call center and each client, respectively. Selection of one of the expanded links causes presentation of a Web page that includes graphs of values of each measure related to the call center/measure specified by the selected link. In some embodiments, the graphs are identical to the graphs presented in response to the selection of appropriate indicators presented by user interface 1320 and/or user interface 1500.

It should be noted that some embodiments of the present invention include features other than those described above. For example, a request for a new interface received in step S1107 may comprise a request for a user interface representing measure values based on calls received over any specified time period. Accordingly, the values are determined with respect to the new time period in step S1103 and corresponding compliance descriptions and indicators are determined in steps S1104 and S1105.

User interfaces presented according to embodiments of the invention may also include an interface for changing a value of a compliance variable associated with a given measure, client, and/or call center. The interface may also allow a user to set instructions and/or conditions for automatically changing a value of one or more compliance variables based on received call center data. As a result, indicators presented in association with a measure may change depending upon the content of received call center data even if a value of the measure does not change.

Process steps 1100 may be altered to create embodiments of the invention different from or according to any of the arrangements mentioned herein. Moreover, although the present invention has been described with respect to particular embodiments and alternative arrangements thereof, those skilled in the art will note that various substitutions may be made to those embodiments and arrangements without departing from the spirit and scope of the present invention.

What is claimed is:

1. A method for monitoring one or more call centers, comprising:
   receiving call center data;
   determining respective values of a plurality of measures based on the call center data;
   determining a compliance description for each of the plurality of measures;
   presenting an indicator in association with each of the plurality of measures, wherein an indicator presented in association with a measure corresponds to a compliance description determined for the measure;
   receiving a selection of a presented indicator; and
   presenting a value of a measure associated with the selected indicator in response to the received selection.

2. A method according to claim 1, wherein each of the determined compliance descriptions is one of a plurality of possible compliance descriptions, and wherein each of the plurality of possible compliance descriptions corresponds to one respective indicator.

3. A method according to claim 2, further comprising:
   receiving an instruction to change the one respective indicator corresponding to one compliance description to a second indicator.

4. A method according to claim 1, wherein the call center data reflects a plurality of call centers.

5. A method according to claim 4, wherein the step of determining respective values of the plurality of measures comprises:
   determining respective values of the plurality of measures for each of the plurality of call centers.

6. A method according to claim 1, wherein the call center data reflects calls received on behalf of a plurality of client entities.

7. A method according to claim 6, wherein the calculating step comprises:
   determining the plurality of measures for each of the plurality of client entities.

8. A method according to claim 1, further comprising:
   presenting call center data used to determine the value.

9. A method according to claim 1, wherein the step of determining a compliance description for a measure comprises:
   determining a compliance description based on a relation of a value of the measure to one or more compliance variables.

10. A method according to claim 9, further comprising:
    receiving an instruction to change one or more of the one or more compliance variables.

11. A method according to claim 9, further comprising:
    automatically changing a compliance variable based at least on received call center data.

12. A user interface for managing call center activity, comprising:
    a plurality of representations each representing one of a plurality of call centers; and
    a plurality of indicators associated with each representation, each of the plurality of indicators associated with a representation being selectable and associated with a respective measure of performance of a call center represented by the representation,
    wherein a value of the respective measure of performance is presented in response to selection of the representation.

13. A user interface according to claim 12, wherein a first of the plurality of indicators is associated with a first measure of performance, wherein a second of the plurality of indicators is associated with a second measure of performance, wherein the first of the plurality of indicators and a second of the plurality of indicators are identical, and wherein the first measure of performance is identical to the second measure of performance.

14. A user interface according to claim 13, further comprising:
    an interface for inputting an instruction to associate the first and second measure of performance with an indicator different from the first indicator and the second indicator.

15. A user interface according to claim 12, wherein the value is presented in a pop-up window.

16. A user interface according to claim 12, further comprising an area presenting comments associated with one or more of the plurality of call centers.

17. A user interface according to claim 12, wherein an indicator is associated with a measure of performance based on at least one compliance variable associated with the indicator and the measure of performance, further comprising:
- an interface for changing a value of the at least one compliance variable.

18. A user interface for managing call center activity, comprising:
- a plurality of representations, each of the plurality of representations representing one of a plurality of clients; and
- a plurality of indicators associated with each representation, each of the plurality of indicators associated with a representation being selectable and associated with a respective measure of performance of one or more call centers relating to a client represented by the representation,
- wherein a value of the respective measure of performance is presented in response to selection of the representation.

19. A user interface according to claim 18, wherein a first of the plurality of indicators is associated with a first measure of performance, wherein a second of the plurality of indicators is associated with a second measure of performance, wherein the first of the plurality of indicators and a second of the plurality of indicators are identical, and wherein the first measure of performance is identical to the second measure of performance.

20. A user interface according to claim 19, further comprising:
- an interface for inputting an instruction to associate the first and second measure of performance with an indicator different from the first indicator and the second indicator.

21. A user interface according to claim 18, wherein the value is presented in a pop-up window.

22. A user interface according to claim 18, further comprising an area presenting comments associated with one or more of the plurality of clients.

23. A user interface according to claim 18, wherein an indicator is associated with a measure of performance based on at least one compliance variable associated with the indicator and the measure of performance, further comprising:
- an interface for changing a value of the at least one compliance variable.

24. A system for presenting call center data, comprising:
- a plurality of call center devices, each of the plurality of call center devices associated with one or more call centers and storing call center data generated based on call center activities provided by the associated one or more call centers;
- a host system for receiving the call center data, for determining values for each of a plurality of measures based on the call center data, for determining a compliance description for each of the plurality of measures, and for associating an indicator with each of the plurality of measures, wherein an indicator associated with a measure represents a compliance description determined for the measure; and
- a user interface device for presenting a user interface comprising one or more of the associated indicators, for receiving a user selection of a presented indicator, and for presenting a value of a measure associated with the presented indicator.

25. A system according to claim 24, wherein each of the determined compliance descriptions is one of a plurality of possible compliance descriptions, and wherein each of the plurality of possible compliance descriptions corresponds to one respective indicator.

26. A system according to claim 24, wherein each of the plurality of indicators is associated with a representation of one of the plurality of call centers, and wherein each indicator associated with a representation of a call center is associated with a measure relating to the call center.

27. A system according to claim 24, wherein each of the plurality of indicators is associated with a representation of one of a plurality of clients, and wherein each indicator associated with a representation of a client is associated with a measure relating to the client.

28. A computer-readable medium storing processor-executable process steps to monitor a call center, the process steps comprising:
- a step to receive call center data;
- a step to determine respective values of a plurality of measures based on the call center data;
- a step to determine a compliance description for each of the plurality of measures;
- a step to present an indicator in association with each of the plurality of measures, wherein an indicator presented in association with a measure corresponds to a compliance description determined for the measure;
- a step to receive a selection of a presented indicator; and
- a step to present a value of a measure associated with the selected indicator in response to the received selection.

29. A medium according to claim 28, wherein each of the determined compliance descriptions is one of a plurality of possible compliance descriptions, and wherein each of the plurality of possible compliance descriptions corresponds to one respective indicator.

30. A medium according to claim 29, the process steps further comprising:
- a step to receive an instruction to change the one respective indicator corresponding to one compliance description to a second indicator.

31. A medium according to claim 28, wherein the step to determine a compliance description for a measure comprises:
- a step to determine a compliance description based on a relation of the value of the measure to a value of a compliance variable.

32. A medium according to claim 31, the process steps further comprising:
- a step to receive an instruction to change the value of the compliance variable.

33. A medium according to claim 31, the process steps further comprising:
- a step to automatically change the value of the compliance variable based at least on received call center data.

34. An apparatus for monitoring a call center, comprising:
- a processor;
- a display; and
- a storage device in communication with the processor and storing instructions adapted to be executed by the processor to:
  receive call center data;
  determine respective values of a plurality of measures based on the call center data;
  determine a compliance description for each of the plurality of measures;

present an indicator in association with each of the plurality of measures, wherein an indicator presented in association with a measure corresponds to a compliance description determined for the measure;

receive a selection of a presented indicator; and present a value of a measure associated with the selected indicator in response to the received selection.

35. An apparatus according to claim 34, wherein each of the determined compliance descriptions is one of a plurality of possible compliance descriptions, and wherein each of the plurality of possible compliance descriptions corresponds to one respective indicator.

36. An apparatus according to claim 35, wherein the storage device further stores instructions adapted to be executed by the processor to:

receive an instruction to change the one respective indicator corresponding to one compliance description to a second indicator.

37. An apparatus according to claim 34, wherein the instruction adapted to be executed by the processor to determine the compliance description comprises an instruction adapted to be executed by the processor to determine the compliance description based on a relation of the value of the measure to a value of a compliance variable.

38. An apparatus according to claim 37, wherein the storage device further stores instructions adapted to be executed by the processor to:

receive an instruction to change the value of the compliance variable.

39. An apparatus according to claim 37, wherein the storage device further stores instructions adapted to be executed by the processor to:

automatically change the value of the compliance variable based at least on received call center data.

* * * * *